United States Patent
Ghosh et al.

(10) Patent No.: US 11,727,420 B2
(45) Date of Patent: Aug. 15, 2023

(54) TIME SERIES CLUSTERING ANALYSIS FOR FORECASTING DEMAND

(71) Applicant: Target Brands, Inc., Minneapolis, MN (US)

(72) Inventors: Koel Ghosh, Minneapolis, MN (US); Luyen Le, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 319 days.

(21) Appl. No.: 16/818,586

(22) Filed: Mar. 13, 2020

(65) Prior Publication Data

US 2020/0294067 A1 Sep. 17, 2020

Related U.S. Application Data

(60) Provisional application No. 62/819,261, filed on Mar. 15, 2019.

(51) Int. Cl.
*G06Q 30/0202* (2023.01)
*G06Q 30/0201* (2023.01)
*G06F 18/21* (2023.01)
*G06F 18/231* (2023.01)
*G06F 18/23211* (2023.01)

(52) U.S. Cl.
CPC ....... *G06Q 30/0202* (2013.01); *G06F 18/217* (2023.01); *G06F 18/231* (2023.01); *G06F 18/23211* (2023.01); *G06Q 30/0201* (2013.01)

(58) Field of Classification Search
None
See application file for complete search history.

(56) References Cited

U.S. PATENT DOCUMENTS

| 2002/0169657 | A1 | 11/2002 | Singh et al. |
| 2014/0122179 | A1 | 5/2014 | Chan et al. |
| 2015/0186792 | A1 | 7/2015 | Chidlovskii |
| 2015/0302432 | A1* | 10/2015 | Chien ............... G06Q 30/0202 705/7.31 |
| 2016/0260111 | A1* | 9/2016 | Ray .................... G06K 9/6218 |
| 2016/0328724 | A1* | 11/2016 | Ray .................... G06Q 10/087 |

(Continued)

OTHER PUBLICATIONS

Bai et al. , Classification and Forecasting for Enterprise Data, Published in: 2018 Chinese Automation Congress (CAC) Date of Conference: Nov. 30-Dec. 2, 2018 (Year: 2018).*

(Continued)

*Primary Examiner* — Chesiree A Walton
(74) *Attorney, Agent, or Firm* — Merchant and Gould, PC

(57) ABSTRACT

Product demand forecasting accuracy utilizes partitional clustering of time series data with dynamic time warping. The product demand forecasting disclosed herein is particularly suited to forecasting product demand for products with limited sales data. Time-series sales data of a producs (or group of products) with limited sales data (e.g. a sparse or no time series of sales data) are dynamically time warped with sales data of products, or groups of products, having extensive sales data (e.g., an extensive time series of sales data) to determine a clustering model with an optimal number of clusters and a prototype time series for each cluster in the model. The prototype time series for the cluster in which the product (or group of products) with limited sales data lies is utilized as its product demand forecast.

18 Claims, 6 Drawing Sheets

(56) References Cited

U.S. PATENT DOCUMENTS

| | | |
|---|---|---|
| 2017/0169446 A1 | 6/2017 | Li et al. |
| 2019/0050763 A1* | 2/2019 | Panda .................. G06N 3/02 |
| 2019/0156253 A1* | 5/2019 | Malyack ............... G06N 5/022 |
| 2020/0074485 A1* | 3/2020 | Popescu ............. G06Q 30/0202 |
| 2020/0104771 A1* | 4/2020 | Popescu ............. G06Q 30/0202 |

OTHER PUBLICATIONS

S. Rani, "Modified hierarchical clustering algorithm for time series data," 2016 3rd International Conference on Computing for Sustainable Global Development (INDIACom), 2016, pp. 4036-4040 (Year: 2016).*

Jha et al., "Clustering to forecast sparse time-series data," 2015 IEEE 31st International Conference on Data Engineering, Seoul, Korea (South), 2015, pp. 1388-1399 (Year: 2015).*

Sanwlani, Monica et al., Forecasting Sales Through Time Series Clustering, International Journal of Data Mining & Knowledge Management Process (IJDKP), vol. 3, No. 1, Jan. 2013, 18 Pages.

Sardá-Espinosa, "Comparing Time-Series Clustering Algorithms in R Using the dtwclust Package," Retrieved from the Internet: <URL: https://www.researchgate.net/publication/312159618_Comparing_Time-Series_Clustering_Algorithms_in_R_Using_the_dtwclust_Package>, Jan. 2018, 45 pages.

* cited by examiner

| #Products Sold Per Child Toy Product Line | 1/1/20 | 1/2/20 | 1/3/20 | ... | 1/29/20 | 1/30/20 | 1/31/20 |
|---|---|---|---|---|---|---|---|
| Fisher-Price | 0 | 12 | 9 | . | 1 | 1 | 1 |
| Lego | 0 | 8 | 3 | . | 2 | 1 | 0 |
| Tonka | 0 | 17 | 2 | . | 2 | 1 | 2 |

FIG. 1B

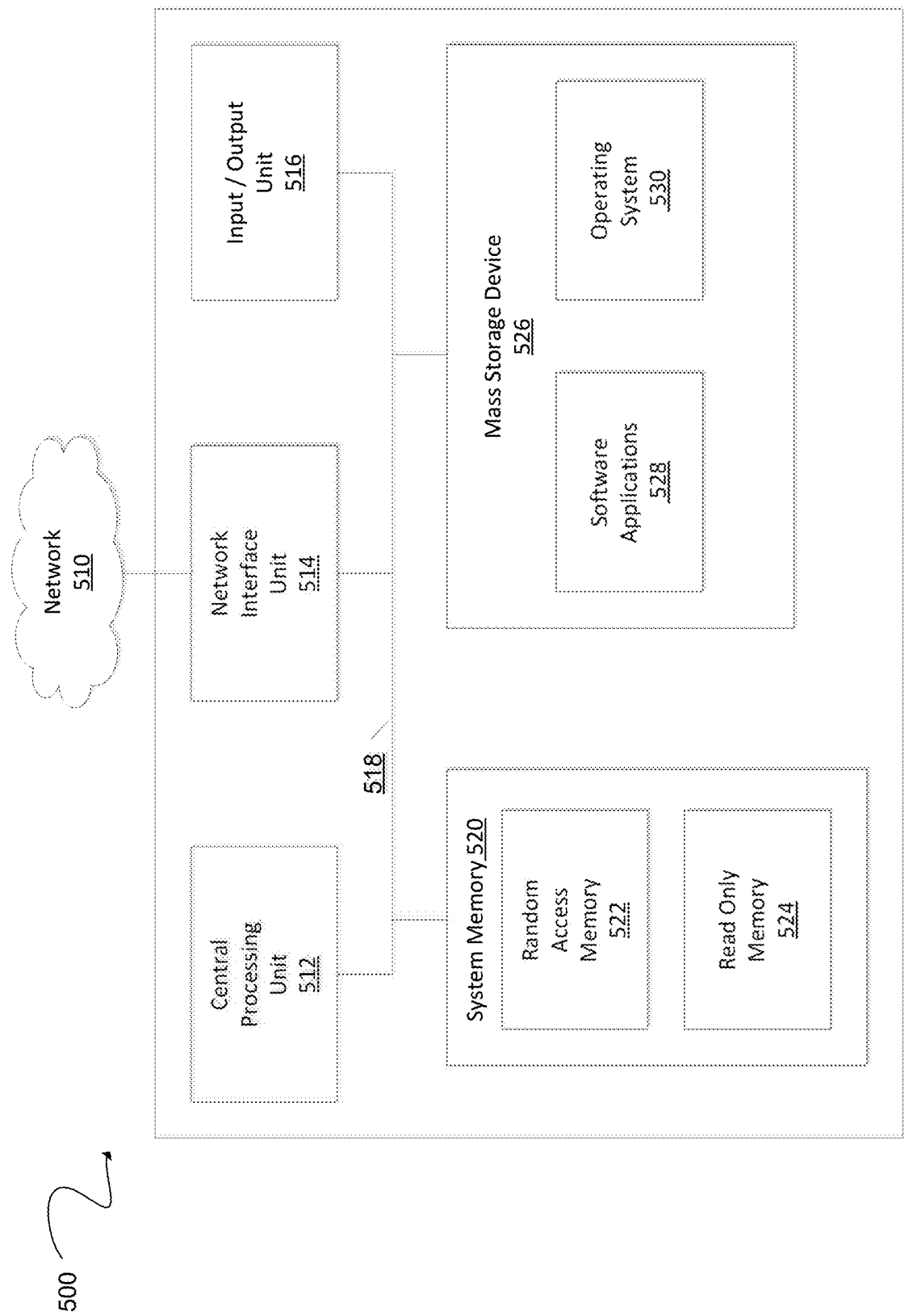

TIME SERIES CLUSTERING ANALYSIS FOR FORECASTING DEMAND

PRIORITY CLAIM

The present application claims priority to U.S. Provisional Application No. 62/819,261, filed Mar. 15, 2019 and entitled "Forecasting Accuracy Gains at Scale with Pre-Model Data Clustering." The noted provisional patent application is hereby incorporated by reference in its entirety.

TECHNICAL FIELD

The present application relates to clustering analysis and, more particularly, time series clustering analysis for forecasting demand of products or services.

BACKGROUND

Big data, e.g. data sets that are too large or too complex to be dealt with by traditional data processing techniques, can now be analyzed using clusters to identify patterns, trends and associations within the data. Clustering is a type of data mining that is used to identify groups, or clusters, of similar objects. As businesses gather huge amounts of data in relation to their products, services, marketing, sales, etc., clustering can be particularly useful to help businesses manage that data. For example, in retail and e-retail businesses, clustering can be used to identify trends in customer shopping behavior, sales campaigns, and customer retention. In the insurance industry, clustering can be used to identify trends related to fraud detection or risk factor identification. In the banking industry, clustering can be used to identify trends related to customer segmentation, credit scoring and customer profitability. Numerous other application for clustering are also possible. Clustering analysis is performed with an eye toward being able to predict future trends, patterns or associations based on what has happened in the past.

However, clustering analysis is typically performed on static data where data with similar characteristics or traits are grouped in a cluster without regard to the time order in which the data was generated. With standard data clustering, forecasting trends for newly introduced products, products that are sold seasonally, or product outliers may be missed because products in these categories may not have a characteristic in common with the majority of the data being analyzed.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

The present disclosure is directed to improving product demand forecasting accuracy using partitional clustering of time series data using dynamic time warping. The product demand forecasting disclosed herein is particularly suited to forecasting product demand for newly introduced products, seasonal products, or product outliers, each of which have limited or no time series sales data, based on time series data of products having an extensive sales data (e.g. a greater amount of sales data than the limited sales data).

An aspect of the present disclosure is directed to a method for forecasting product demand. The method includes receiving time series sales data for a first product and receiving time series sales data of a plurality of different second products. The time series sales data of each of the different second products is longer than the time series sales data of the first product. The method further includes, for each of the different second products, dynamically time warping the time series sales data of the first product with the respective time series sales data of the respective second products to create a dynamically time warped dataset. The method further includes, for each dynamically time warped dataset, performing a clustering analysis to obtain a clustering model with an optimal number of clusters. Then, for each cluster within the clustering model with the optimal number of clusters, defining a prototype time series. Further, from the clustering model with the optimal number of clusters, determining within which cluster the time series sales data for the first product lies; and based on the cluster within which the time series sales data for the first product lies, utilize the prototype time series as the forecast for product of demand of the first product.

In certain aspects the method described in the paragraphs above includes a clustering analysis that utilizes partitional clustering and/or includes application of one or more clustering validity indices to obtain a clustering model with an optimal number of clusters.

DESCRIPTION OF THE DRAWINGS

Non-limiting and non-exhaustive examples are described with reference to the following Figures.

FIG. 1B is an example of time series data related to the product hierarchy.

FIG. 5 is a block diagram of an example computing device.

DETAILED DESCRIPTION

Various embodiments are described in detail with reference to the drawings that form a part hereof and, in which are shown by way of illustrations, specific embodiments or examples. Embodiments can be practiced as methods, system or devices. Accordingly, embodiments may take the form of a hardware implementation, a software implementation, or an implementation combining both hardware and software. The following detailed description is therefore not to be taken in a limiting sense, and the scope of the present disclosure is defined by the appended claims and their equivalents.

The present disclosure is directed to improving product demand forecasting accuracy by using partitional clustering of time series data using dynamic time warping. The product demand forecasting disclosed herein is particularly suited to forecasting product demand for newly introduced products, seasonal products, or product outliers, each of which have limited sales data. Time-series sales data of products (or groups of products) with limited sales data (e.g. a sparse time series of sales data) are dynamically time warped with sales data of products, or groups of products, having extensive sales data (e.g., an extensive time series of sales data) to determine which product (or group of products) the products with limited sales data most closely match under a cluster analysis. The closest matching cluster analysis shows a correlation (i.e., shows a similarly in sales pattern over time) between the product with limited sales data and the product with the extensive sales indicating that product demand for the product with limited sales will reflect product demand of the correlated product with extensive sales.

The description provided herein is done so in reference to a particular application of time series clustering analysis, i.e., time series clustering analysis for product (or service) demand forecasting. It should be understood that, while a specific example and application are used, the systems and methods for time series clustering analysis are equally applicable to any big data environment for which there is a desire to identify trends, patterns or associations.

Figure 1A:
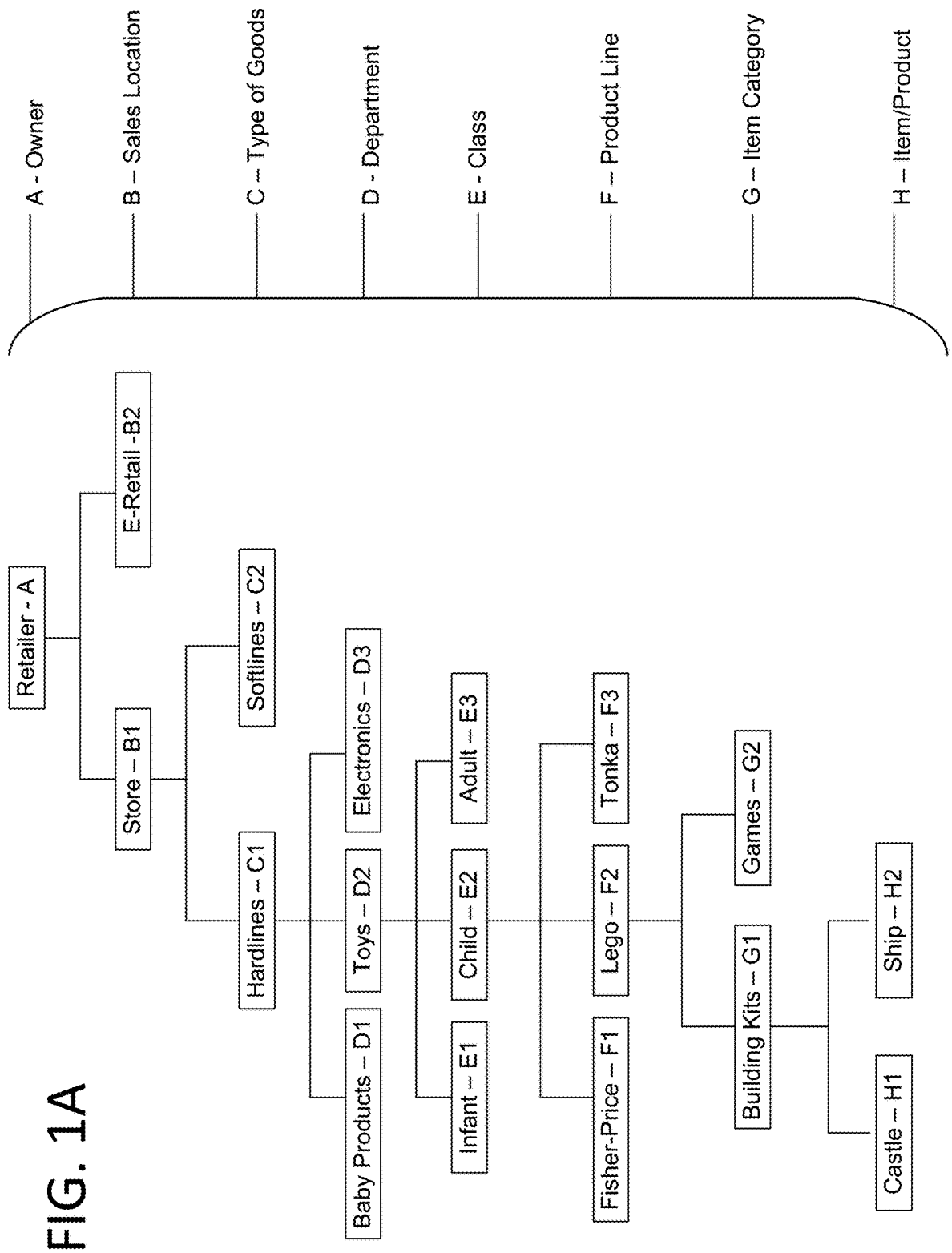
FIG. 1A is an example of a partial retail product hierarchy.

Retailers typically organize their products according to a predetermined product hierarchy. Each level of the hierarchy, alone or in combination with one or more levels of the hierarchy, is an attribute associated with a specific product for which a clustering analysis can be performed. An example of a partial product hierarchy, including eight different levels within the hierarchy, is illustrated in FIG. 1(A). As shown, the hierarchy includes level A identifying the Retailer. Below the retailer, level B identifies a retail location of the retailer, which includes a Retail Site—B1 and an E-retail Website—B2. Beneath the retail location, the hierarchy includes level C identifying a type of goods, which includes Hardline Goods—C1 and Softline Goods—C2. Beneath the type of goods, the hierarchy includes level D identifying a department of goods, which includes a Baby Goods—D1, a Toys Department—D2, and an Electronics Department—D3. The goods within each department are divided into classes in level E of the hierarchy, which include an Infant Class—E1, a Child Class—E2 and an Adult Class—E3. The class of goods are then divided into product lines in level F of the hierarchy. The Child Class—E2 is divided into a Fisher-Price Product Line—F1, a Lego Product Line—F2 and a Tonka Product Line—F3. The product line is further divided at level G with an item category. The Lego Product Line—F2 is divided into a Building Kit Category—G1 and a Games Category—G2. Finally, the item category is broken into individual items/products at level H of the hierarchy with a Castle Item—H1 and a Cruise Ship Item—H2. With such a hierarchy, each item within a retailer's inventory and each item sold can be identified with eight data attributes; greater or lesser levels of product hierarchy can also be used. For example, the Cruise Ship Item can be identified with data attributes [H2, G1, E2, D2, C1, B1, A]. These hierarchical data attributes in combination with time series data attributes (date and/or time of day) specific to the time of sale of each item can be used in the time series clustering analysis of the present disclosure to forecast item demand including item demand for new products, seasonal products and/or product outliers (generally referred to as products having limited sales data).

FIG. 1(B) illustrates an example time series dataset based upon the sales of products. In the illustrated example, the dataset includes the number of products sold (e.g., the hierarchical data attributes) in the Fisher-Price Product Line—F1, the Lego Product Line—F2 and the Tonka Product Line—F3 for each day over the period of Jan. 1, 2020 to Jan. 31, 2020 (the time series data attributes). The data can represent data for e-retail, retail at one or more specific retail sites, or a combination of retail and e-retail. Of course, the illustrated example is but one small sampling of the quantity of data at various levels of the product hierarchy and one small sampling of a time series data. Other data samplings at one or more of the product hierarchy levels and/or other time series data can also be used.

Figure 2:
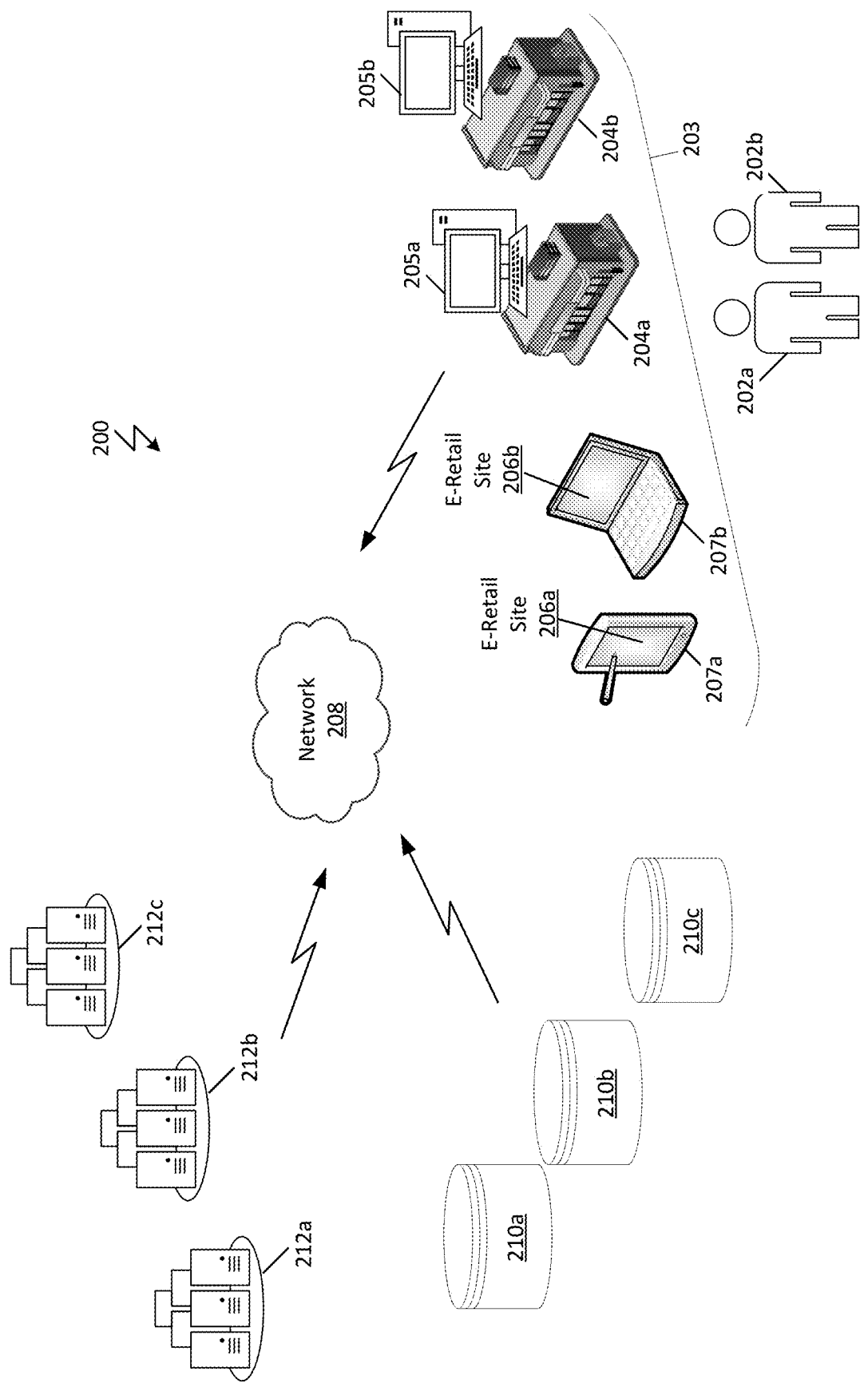
FIG. 2 is an example configuration of one possible environment that can be used for gathering time series data.

Referring to FIG. 2, an example configuration of a retail environment 200 that generates and tracks time series data (e.g. product identification and date of sale) for each retail item sold is illustrated. In the example of FIG. 2, a guest 202, e.g., guest 202a and guest 202b, purchase items from a retailer 203. The retailer 203 is represented by both physical retail sites 204 and e-retail websites 206. Each physical retail site 204, e.g., physical retail site 204a and 204b, utilizes one or more retail computing devices 205, e.g., retail computing device 205a, 205b, for generating, tracking, transmitting and/or receiving data related to each item sold at the retail site 204. Each e-retail website 206, e.g. e-retail website 206a and 206b, is accessed via one or more e-retail computing devices 207, e.g. e-retail computing device 207a and 207b, which can be used for generating, transmitting and/or receiving data related to each item sold via the e-retail website 206.

The time series data generated from each item purchased by the guests 202 at the retailer 203 are transmitted through a network 208 and stored in one or more databases of one or more memory devices 210 (e.g., memory device 210a, memory device 210b, memory device 210c). The data stored by the one or more memory devices 210 is accessible via network 208 (or direct access) by one or more server computing devices 212 (e.g., server computing devices 212a, server computing devices 212b, server computing devices 212c). The one or more server computing devices 212 execute instructions to perform time series clustering analysis as further detailed herein. Note the environment 200 is but one possible configuration of an environment for generating/tracking time series data and for performing time series clustering analysis and, as known by those skilled in the art, can be condensed or expanded to include a fewer or greater number of elements than that depicted.

In a basic configuration, the one or more e-retail computing devices 207 are personal or handheld computers having both input elements and output elements operated by the one or more guests 202. For example, the one or more e-retail computing devices 207 may include one or more of: a mobile telephone; a smart phone; a tablet; a phablet; a smart watch; a wearable computer; a personal computer; a desktop computer; a laptop computer; a gaming device/computer (e.g., Xbox); a television; and the like. This list is only and should not be considered as limiting. Any suitable e-retail computing device 207 for generating and/or tracking hierarchical and time series attributes related to items purchased by guests 202 via the retailer 203 can be used. Similarly the one or more retail computing devices 205 are computing devices having both input and output elements operated by one or more retail employees that are capable of generating and/or tracking hierarchical and time series data attributes relating to items purchased at the physical retail site 204.

In certain embodiments, the network 208 is a computer network such as an enterprise intranet and/or the Internet. In this regard, the network 208 may include a Local Area Network (LAN), a Wide Area Network (WAN), the Internet, wireless and wired transmission mediums. In certain embodiments, server computing devices 212 may communicate with some components of the environment via a local network (e.g., an enterprise intranet), whereas another server computing device 212 may communicate with other components of the environment via a wide area network (e.g., the Internet). In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet.

In a basic configuration, server computing devices 212 may include at least a processing unit and a system memory for executing computer-readable instructions. In some aspects, server computing devices 212 may comprise one or more server computing devices 212 in a distributed environment (e.g., cloud-based computing environment).

Figure 3:
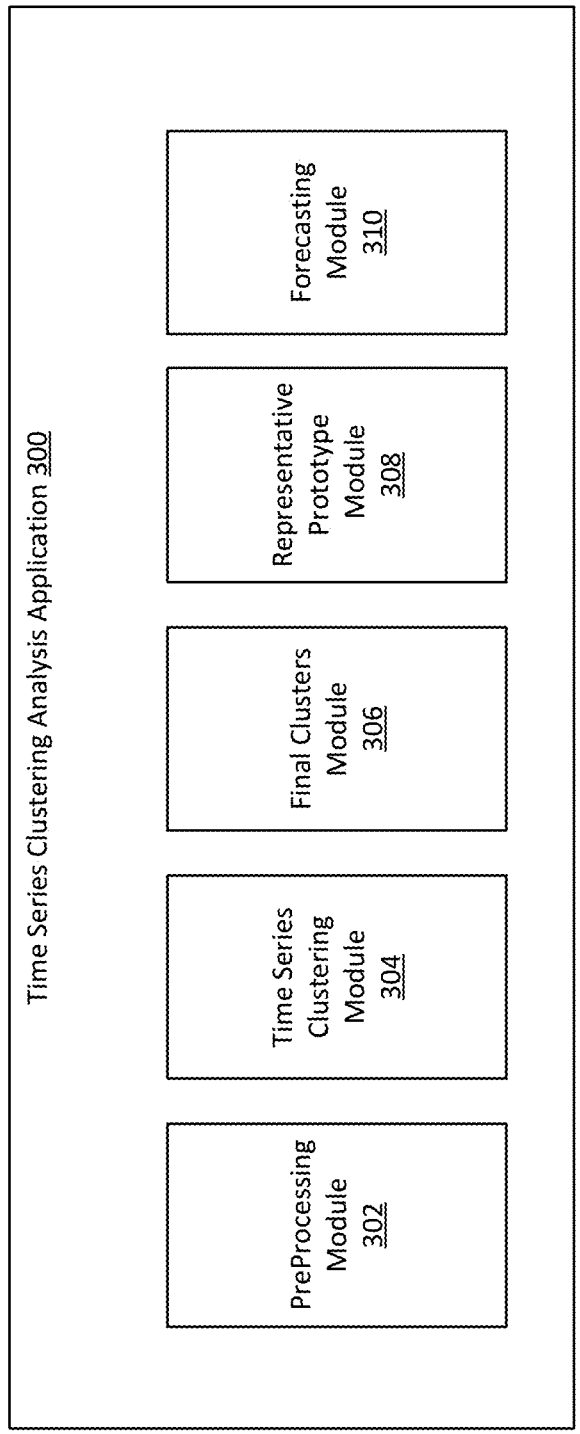
FIG. 3 is an example configuration of a time series clustering analysis application.

In certain embodiments, the server computing devices 212 execute instructions of a time series clustering analysis application for forecasting product demand. Referring to FIG. 3, an example configuration of a time series clustering analysis application 300 is illustrated. As shown, the time series clustering analysis application 300 includes a preprocessing module 302, a time series clustering module 304, a final clusters module 306, a representative prototype module 308, and a forecasting module 310.

The preprocessing module 302 operates to z-score (or normalize) the product hierarchical data and the time series data selected for analysis. A z-score is a numerical measurement used in statistics of a value's relationship to the mean (average) of a group of values measured in terms of standard deviations from the mean so that all values have a value between 0 and 1. If a z-score is 0, it indicates that the data point's score is identical to the mean score. The z-scored data of the pre-processing module 302 is provide to the time series clustering module 304.

The time series clustering module 304 operates to perform partitional clustering of time series data using dynamic time warping on the pre-processed data supplied by the preprocessing module 302. Time series clustering generally involves making parameter choices for: (a) a distance measure (e.g., quantifying dissimilarity between different series; (b) a cluster algorithm (e.g., how to form groups or clusters); and (c) a prototype (summarizing characteristics of all series in a cluster).

As indicated, the chosen distance measure is dynamic time warping (DTW). DTW is capable of comparing two series that are unequal in their length. Consider an example situation wherein six months of sales data exists for the different brands of child toys but a new product is now being offered for which there is only two weeks of sales data (e.g. a first time series of six months as compared to a second time series of two weeks). The two weeks of data can be assessed against the six months of data of each toy sold to determine a cluster of toys having a temporal sequence that most optimally matches the temporal sequence of the new product according to certain restrictions and rules. The cluster of toys with the optimal match can then provide a forecast of future sales of the new product based on the sales of the six months data associated with the cluster of toys having the optimal match. The same is applicable with reference to a seasonal product, e.g., sold only during a certain time period, with limited sales data, to forecast future sales of the seasonal product or an outlier product (e.g., a rarely sold product) with limited sales data or to a new product with limited sales data.

The restrictions and rules applicable to DTW are known and include:
Every index from the first sequence must be matched with one or more indices from the other sequence, and vice versa The first index from the first sequence must be matched with the first index from the other sequence (but it does not have to be its only match)

The last index from the first sequence must be matched with the last index from the other sequence (but it does not have to be its only match)

The mapping of the indices from the first sequence to indices from the other sequence must be monotonically increasing, and vice versa, i.e. if j>i are indices from the first sequence, then there must not be two indices l>k in the other sequence, such that index i is matched with index l and index j is matched with index k and vice versa An optimal match is denoted by the match that satisfies all the restrictions and the rules and that has the minimal cost, where the cost is computed as the sum of absolute differences, for each matched pair of indices, between their values.

The clustering algorithm, as indicated, comprises partitional clustering, wherein data is assigned to one and only one cluster out of k clusters with k being a specified value. In partitional clustering, k centroid are randomly initialized and assigned to individual clusters. The distance between all data and all centroids is calculated, and series are assigned to the cluster of its closest centroid. A prototyping function is applied to each cluster to update the corresponding centroid. Then, distances and centroids are updated iteratively until a certain number of iterations have elapsed.

The selected prototyping function used with the clustering algorithm comprises a partition around medoids (PAM) prototype function. A medoid is a representative object from a cluster, which in this case is also a time series, whose average distance to all other objects in the same cluster is minimal. Since the medoid object is always an element of the original data, PAM is sometime preferred over mean or median so that time-series structure is not altered.

The time series clustering module 304 outputs multiple clustering models with each of the clustering models having a different k number of clusters.

The various clustering models of the time series clustering module 304 are provided to the final clusters module 306, which determines the clustering model with the optimal number of clusters. The final clusters module 306 utilizes one or more cluster validity indices (CVI) in assessing the various clustering models. In certain examples, the CVI comprises a Silhouette index, a Dunn index, a Calinski-Harabasz index, a COP index and/or a Davies-Bouldin index. The Silhouette index is used to provide a silhouette value that is a measure of how similar an object is to its own cluster compared to other clusters; a high silhouetted value is desired. The Dunn index is a value indicating compactness of clusters and separation from other clusters; a high Dunn index value is desired. The Calinski-Harbasz index evaluates cluster validity based on the average between and within cluster sum of square; a high Calinski-Harbasz index is desired. The COP index is a ratio-type index where the cohesion of a cluster is estimated from the points in a cluster to its centroid and the separation is based on the furthest neighbor distance; a low COP index value is desired. The Davies-Bouldin index is an internal evaluation scheme were the validation of how well the clustering has been done is made using quantities and feature inherent to the dataset; a low Davies-Bouldin index is desired. The cluster model with the optimal number of clusters is produced by the final clusters module 306.

For each of the dusters in the duster model that was determined to have optimal number of dusters, the representative prototype module 308 fixes or sets the prototype. The prototype is typically the medoid of the cluster (e.g., the most representative time series of the cluster that minimizes the sum of distances to the other timer series sequences within the same cluster). The prototype time series of the cluster in which the product with limited time series data (or no time series data) is placed represents the forecasted time series for the product with limited or no time series data (e.g., product demand for the product with limited sales data will likely reflect product demand of the the products within the same cluster that have extensive sales time series data for a future corresponding time period). The forecasted time series can be output and utilized for various purposes, e.g. sales, marketing, supply chain, etc.

Clustering items within an existing product hierarchy group can help to improvide demand forecasting for that group. However, when no product group exists, such as for a new product with limited sales data, time series clusters are used to form groups in a data set of a plurality of time series that can be used for forecasting. The advantatge with time series clusters using dynamic time warping is that a short time series (or no time series data) for a product can be evaluated with longer time series of existing products to discover a cluster with a prototype medoid (a prototype time series) that is a forecast for each time series and their respective product within the cluster including the short or no time series and its respective product.

As noted herein, forecasting product demand (or product sales), for newly introduced products, seasonal products and/or outlier products with limited sales data can be achieved through partitional clustering of time series data using dynamic time warping on product time series data. The same can be applied at different levels of the product hierarchy. The forecasts determined through partitional clustering of time series data using dynamic time warping can be used in marketing, finance and supply chain. For example, a current product hierarchy can be refined by using dynamic time warping to cluster items within the hierarchy. The new clusters can then be used in the next step of forecasting. Because the new clusters lead to better forecasts, lower stockouts can be used to ensure that customer demand is met, which can lead to high revenue.

Figure 4:
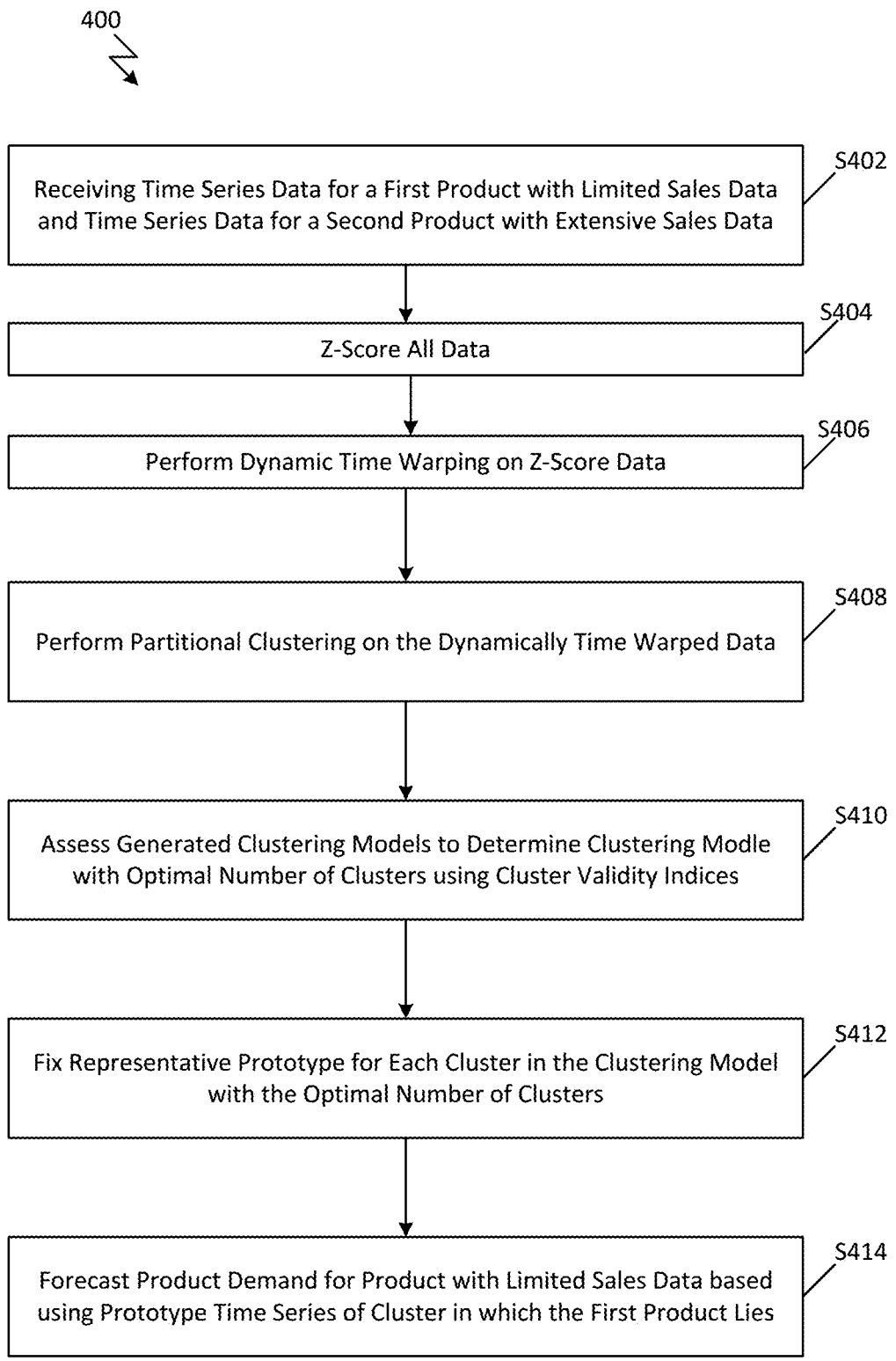
FIG. 4 is a flowchart illustrating an example method for time series clustering analysis.

FIG. 4 is a flowchart illustrating an example method 400 of product demand forecasting accuracy using partitional clustering of time series data using dynamic time warping. The method 400 can be performed, for example, using the a time series clustering analysis application 300 described above in conjunction with FIG. 3.

The method 400 begins with receiving time series data of: (a) the sales of a first product (or group of products) from a product hierarchy, such as the product hierarchy of FIG. 1(A), the time series data of the sales of the first product including a limited history of sales (e.g., less than six months); and receiving time series data of the sales of a second product from the product hierarchy, the time series data of the sales of the second product including an extensive history of sales (e.g., six months or greater history of sales), 5402. Note the time period of extensive sales may be any desired time period but is preferably a longer time period than the time period of limited sales.

The data received is then z-scored, 5404, and distance measured using dynamic time warping, 5406, enabling comparison of the two or more different time series with different lengths. Partitional clustering, 5408, is then applied to the distance measured data, using a partition around medoid (PAM) for centroid specification, to generate a plurality of clustering models with each clustering model having a different k number of clusters. The clustering models are then assessed to determine which one of the clustering models has an optimal number of clusters using a cluster validity indices (CVI), 5410. The representative prototype, which is a representative time series, for each cluster is then fixed, 5412. The representative time series is representative of sales patterns over time for each product in the cluster including the product with limited sales data and, thereby, provides a forecast for product demand for the product with limited sales data for any time period, 5414. A time series data table or graphical representation can be produced to visualize the forecast for product demand. Further, forecast for product demand can be utilized in other calculations and/or business decisions relating to sales, marketing, inventory control, etc.

Referring now to FIG. 5, an example block diagram of a computing device 500 is shown that is useable to implement aspects of the environment 200 of FIG. 2. In the embodiment shown, the computing device 500 includes at least one central processing unit ("CPU") 512, a system memory 520, and a system bus 518 that couples the system memory 520 to the CPU 512. The system memory 520 includes a random access memory ("RAM") 522 and a read-only memory ("ROM") 524. A basic input/output system that contains the basic routines that help to transfer information between elements within the computing device 500, such as during startup, is stored in the ROM 524. The computing device 500 further includes a mass storage device 526. The mass storage device 526 is able to store software instructions and data.

The mass storage device 526 is connected to the CPU 512 through a mass storage controller (not shown) connected to the system bus 518. The mass storage device 526 and its associated computer-readable storage media provide non-volatile, non-transitory data storage for the computing device 500. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 512 can read data and/or instructions. In certain embodiments, the computer-readable storage media comprises entirely non-transitory media.

Computer-readable storage media include volatile and non-volatile, removable and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 500.

According to various embodiments of the invention, the computing device 500 may operate in a networked environment using logical connections to remote network devices through a network 510, such as a wireless network, the Internet, or another type of network. The computing device 500 may connect to the network 108 through a network interface unit 514 connected to the system bus 518. It should be appreciated that the network interface unit 514 may also be utilized to connect to other types of networks and remote computing systems. The computing device 500 also includes an input/output unit 516 for receiving and processing input from a number of other devices, including a touch user interface display screen, or another type of input device. Similarly, the input/output unit 516 may provide output to a touch user interface display screen or other type of output device.

As mentioned briefly above, the mass storage device 526 and the RAM 522 of the computing device 500 can store software instructions and data. The software instructions include an operating system 530 suitable for controlling the operation of the computing device 500. The mass storage device 526 and/or the RAM 522 also store software instructions, that when executed by the CPU 512, cause the computing device 500 to provide the functionality discussed in this document. For example, the mass storage device 526 and/or the RAM 522 can store software instructions that, when executed by the CPU 512, cause the computing device 500 to perform product demand forecasting through use of time series clustering with dynamic time warping.

As should be appreciated, the various aspects (e.g., portions, components, etc.) described with respect to the figures herein are not intended to limit the systems and methods to the particular aspects described. Accordingly, additional configurations can be used to practice the methods and systems herein and/or some aspects described can be excluded without departing from the methods and systems disclosed herein.

Similarly, where steps of a process/method are disclosed, those steps are described for purposes of illustrating the present methods and systems and are not intended to limit the disclosure to a particular sequence of steps. For example, the steps can be performed in differing order, two or more steps can be performed concurrently, additional steps can be performed, and disclosed steps can be excluded without departing from the present disclosure.

Although specific aspects are described herein, the scope of the technology is not limited to those specific aspects. One skilled in the art will recognize other aspects or improvements that are within the scope of the present technology. Therefore, the specific structure, acts, or media are disclosed only as illustrative aspects. The scope of the technology is defined by the following claims and any equivalents therein.

What is claimed:

1. A method for forecasting product demand for a product having limited historical sales data, comprising:
    receiving, at one or more retail computing devices, item sales data of a first product from a retail website, the item sales data of the first product being specific to a time period of sale of the first item;
    generating, by the one or more retail computing devices, time series data for the first product;
    storing the time series data for the first product in at least one analysis database;
    receiving, at an enterprise server, time series sales data for the first product from the at least one analysis database;
    receiving, at the enterprise server from the at least one analysis database, time series sales data of a plurality of different second products, the time series sales data of each of the different second products corresponding to sales data of each of the different second products and each having a time period being longer than the time period of sale of the first item represented in the time series sales data of the first product, and the time series sales data of the first product being of a limited duration and/or representing sparse sales data;
    for each of the different second products, dynamically time warping the time series sales data of the first product at the enterprise server with the respective time series sales data of the respective second product to determine a distance score;
    performing, at the enterprise server, a partitional clustering to create a plurality of clustering models, each of the plurality of clustering models being generated using a partition around medoid (PAM) function and including a different number of clusters and representing a clustering of the first product and the plurality of different second products;
    identifying a clustering model of the plurality of clustering models as an optimal clustering model based, at least in part, on cluster validity indices associated with each of the plurality of clustering models, the optimal clustering model including an optimal number of clusters;
    defining a prototype time series for each cluster within the optimal clustering model, each prototype time series being representative of each of the time series included within the cluster corresponding to that prototype time series, each prototype time series having a time period longer than the time period of sale of the first item;
    determining within which cluster within the optimal clustering model the time series sales data for the first product lies;
    generating a modeled forecast of demand of the first product, the modeled forecast of demand of the first product including a time-series demand prediction for the first product based on the prototype time series associated with the cluster within which the time series sales data for the first product is clustered; and
    transmitting a message from the enterprise server to an inventory control system to adjust a stock level of the first item in accordance with the modeled forecast of demand of the first product.

2. The method of claim 1, further comprising z-scoring the time series data.

3. The method of claim 1, wherein the first product is from a pre-defined multi-level product hierarchy.

4. The method of claim 3, wherein the plurality of different second products are selected from the pre-defined multi-level product hierarchy.

5. The method of claim 4, wherein the clustering analysis is based on:
    first hierarchical data attributes associated with the first product,
    second hierarchical data attributes associated with each of the plurality of second products,
    first time series data attributes associated with the time series sales data for the first product, and
    second time series data attributes associated with the time series sales data for the plurality of second products,
    wherein the pre-defined multi-level product hierarchy comprises a plurality of levels, each level of the plurality of levels corresponding to a hierarchical data attribute,
    wherein the first time series data attributes are specific to the times of sale of the first product, and the second time series data attributes are specific to the times of sale of each of the plurality of second products.

6. The method of claim 1, further comprising utilizing the forecast of demand of the first product to calculate inventory needs of the first product within a supply chain of an enterprise.

7. A method for forecasting product demand for a product having limited historical sales data, comprising:
- receiving, at one or more retail computing devices, item sales data of a first product from a retail website, the item sales data of the first product being specific to a time period of sale of the first item;
- generating, by the one or more retail computing devices, time series data for the first product
- storing the time series data for the first product in at least one analysis database;
- receiving, at an enterprise server, time series sales data for the first product from the at least one analysis database;
- receiving, at the enterprise server from the at least one analysis database, time series sales data of a plurality of different second products, the time series sales data of each of the different second products corresponding to sales data of each of the different second products and each having a time period being longer than the time period of sale of the first item represented in the time series sales data of the first product, and the time series sales data of the first product being of a limited duration and/or representing sparse sales data;
- for each of the different second products, dynamically time warping the time series sales data of the first product at the enterprise server with the respective time series sales data of the respective second product to determine a distance score;
- performing, at the enterprise server, a partitional clustering to create a plurality of clustering models, each of the plurality of clustering models being generated using a partition around medoid (PAM) function and including a different number of clusters and representing a clustering of the first product and the plurality of different second products;
- identifying a clustering model of the plurality of clustering models as an optimal clustering model based, at least in part, on cluster validity indices associated with each of the plurality of clustering models, the optimal clustering model including an optimal number of clusters;
- defining a prototype time series for each cluster within the optimal clustering model, each prototype time series being representative of each of the time series included within the cluster corresponding to that prototype time series, each prototype time series having a time period longer than the time period of sale of the first item, the prototype time series for each cluster corresponding to a medoid of the cluster;
- determining within which cluster within the optimal clustering model the time series sales data for the first product lies; and
- generating a modeled forecast of demand of the first product, the modeled forecast of demand of the first product including a time-series demand prediction for the first product based on the prototype time series associated with the cluster within which the time series sales data for the first product is clustered; and
- transmitting a message from the enterprise server to an inventory control system to adjust a stock level of the first item in accordance with the modeled forecast of demand of the first product.

8. The method of claim 7, further comprising z-scoring the time series data.

9. The method of claim 7, wherein the first product is from a pre-defined multi-level product hierarchy.

10. The method of claim 9, wherein the plurality of different second products are selected from the pre-defined multi-level product hierarchy.

11. The method of claim 10, wherein the clustering analysis is based on:
- first hierarchical data attributes associated with the first product,
- second hierarchical data attributes associated with each of the plurality of second products,
- first time series data attributes associated with the time series sales data for the first product, and
- second time series data attributes associated with the time series sales data for the plurality of second products,
- wherein the pre-defined multi-level product hierarchy comprises a plurality of levels, each level of the plurality of levels corresponding to a hierarchical data attribute,
- wherein the first time series data attributes are specific to the times of sale of the first product, and the second time series data attributes are specific to the times of sale of each of the plurality of second products.

12. The method of claim 7, further comprising utilizing the forecast of demand of the first product to calculate inventory needs of the first product within a supply chain of an enterprise.

13. A method for forecasting product demand for a product having limited historical sales data, comprising:
- receiving, at one or more retail computing devices, item sales data of a first product from a retail website, the item sales data of the first product being specific to a time period of sale of the first item;
- generating, by the one or more retail computing devices, time series data for the first product storing the time series data for the first product in at least one analysis database of at least one memory device;
- receiving, at an enterprise server, time series sales data for the first product from the at least one analysis database of the at least one memory device;
- receiving, at the enterprise server from the at least one analysis database, time series sales data of a plurality of different second products, the time series sales data of each of the different second products corresponding to sales data of each of the different second products and each having a time period being longer than the time period of sale of the first item represented in the time series sales data of the first product, and the time series sales data of the first product being of a limited duration and/or representing sparse sales data;
- normalizing the time series sale data of the first product and the time series sales data of the second product
- for each of the different second products, dynamically time warping the time series sales data of the first product at the enterprise server with the respective time series sales data of the respective second product to determine a distance score;
- performing, at the enterprise server, a partitional clustering to create a plurality of clustering models, each of the plurality of clustering models being generated using a partition around medoid (PAM) function and including a different number of clusters and representing a clustering of the first product and the plurality of different second products;
- identifying a clustering model of the plurality of clustering models as an optimal clustering model based, at least in part, on cluster validity indices associated with each of the plurality of clustering models, the optimal clustering model including an optimal number of clusters;

defining a prototype time series for each cluster within the optimal clustering model, each prototype time series being representative of each of the time series included within the cluster corresponding to that prototype time series, each prototype time series having a time period longer than the time period of sale of the first item, the prototype time series for each cluster corresponding to a medoid of the cluster;

determining within which cluster within the optimal clustering model the time series sales data for the first product lies; and generating a modeled forecast of demand of the first product, the modeled forecast of demand of the first product including a time-series demand prediction for the first product based on the prototype time series associated with the cluster within which the time series sales data for the first product is clustered; and transmitting a message from the enterprise server to an inventory control system to adjust a stock level of the first item in accordance with the modeled forecast of demand of the first product.

14. The method of claim 13, wherein normalizing the time series sale data of the first product and the time series sales data of the second product includes z-scoring the time series sale data of the first product and the time series sales data of the second product.

15. The method of claim 13, wherein the first product is from a pre-defined multi-level product hierarchy.

16. The method of claim 15, wherein the plurality of different second products are selected from the pre-defined multi-level product hierarchy.

17. The method of claim 13, wherein the first product and the plurality of different second products are selected from different levels of the pre-defined multi-level product hierarchy.

18. The method of claim 13, further comprising utilizing the forecast of demand of the first product to calculate inventory needs of the first product within a supply chain of an enterprise.

* * * * *